United States Patent
Tamaru

(10) Patent No.: US 9,025,049 B2
(45) Date of Patent: May 5, 2015

(54) IMAGE PROCESSING METHOD, IMAGE PROCESSING APPARATUS, COMPUTER READABLE MEDIUM, AND IMAGING APPARATUS

(75) Inventor: Masaya Tamaru, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 412 days.

(21) Appl. No.: 12/855,072

(22) Filed: Aug. 12, 2010

(65) Prior Publication Data

US 2011/0037877 A1 Feb. 17, 2011

(30) Foreign Application Priority Data

Aug. 13, 2009 (JP) ................................. 2009-187830

(51) Int. Cl.
- *H04N 5/262* (2006.01)
- *H04N 5/235* (2006.01)
- *H04N 5/232* (2006.01)

(52) U.S. Cl.
CPC ......... *H04N 5/2356* (2013.01); *H04N 5/23229* (2013.01); *H04N 5/2621* (2013.01); *H04N 2201/0084* (2013.01)

(58) Field of Classification Search
USPC ................................................. 348/239, 241
See application file for complete search history.

(56) References Cited

U.S. PATENT DOCUMENTS

| | | | | |
|---|---|---|---|---|
| 2003/0206231 | A1* | 11/2003 | Chen et al. | 348/207.99 |
| 2004/0062450 | A1* | 4/2004 | Kondo et al. | 382/266 |
| 2006/0038899 | A1* | 2/2006 | Tamaru et al. | 348/241 |
| 2007/0242320 | A1 | 10/2007 | Horie | |
| 2008/0106615 | A1 | 5/2008 | Ahonen et al. | |
| 2009/0009649 | A1* | 1/2009 | Okamoto | 348/340 |
| 2009/0109304 | A1* | 4/2009 | Guan | 348/240.99 |
| 2009/0136148 | A1 | 5/2009 | Lim et al. | |
| 2010/0061642 | A1 | 3/2010 | Kondo et al. | |

FOREIGN PATENT DOCUMENTS

| | | |
|---|---|---|
| CN | 1961569 A | 5/2007 |
| CN | 101088104 A | 12/2007 |
| CN | 101426093 A | 5/2009 |
| EP | 2 059 024 A2 | 5/2009 |
| JP | 7-021365 A | 1/1995 |
| JP | 2008233470 A | 10/2008 |
| JP | 2008-271240 A | 11/2008 |
| JP | 2008-271241 A | 11/2008 |
| JP | 2009110137 A | 5/2009 |

OTHER PUBLICATIONS

Francesc Moreno-Noguer et al, "Active Refocusing of Images and Videos", ACM Transactions on Graphics, vol. 26, No. 3, 67, Jul. 2007, pp. 67-1-67-9, XP002610925, ACM USA, ISSN: 0730-0301.

(Continued)

*Primary Examiner* — Antoinette Spinks

(74) *Attorney, Agent, or Firm* — Studebaker & Brackett PC

(57) ABSTRACT

In the present invention, an image processing method includes a dividing process, a performing process, and a superimposing process. In the dividing process, an image is divided into plural local portions. In the performing process, the blurring processing is performed on at least one of the plural local portions. In the superimposing process, the artificial noise is superimposed on the at least one local portion.

16 Claims, 18 Drawing Sheets

(56) References Cited

OTHER PUBLICATIONS

Extended European Search Report dated Dec. 17, 2010 for European Patent Application No. EP 10 25 1443.
An Office Action "Notice of Reasons for Rejection" issued by the Japanese Patent Office on Jul. 30, 2013, which corresponds to Japanese Patent Application No. 2009-187830 and is related to U.S. Appl. No. 12/855,072; with partial translation.
An Office Action; "Notification of the First Office Action" issued by the State Intellectual Property Office of P.R.C. on Sep. 4, 2013, which corresponds to Chinese Patent Application No. 201010256012.2 and is related to U.S. Appl. No. 12/855,072; with English Language translation.

* cited by examiner

IMAGE A

IMAGE B

| FILTER 0: | 0 | 0 | 0 | 0 | 0 | 256 | 0 | 0 | 0 | 0 | 0 |
|---|---|---|---|---|---|---|---|---|---|---|---|
| FILTER 1: | 0 | 0 | 0 | 0 | 64 | 128 | 64 | 0 | 0 | 0 | 0 |
| FILTER 2: | 0 | 0 | 0 | 16 | 64 | 96 | 64 | 16 | 0 | 0 | 0 |
| FILTER 3: | 0 | 1 | 8 | 28 | 56 | 70 | 56 | 28 | 8 | 1 | 0 |
| FILTER 4: | 2 | 7 | 18 | 31 | 45 | 50 | 45 | 31 | 18 | 7 | 2 |

NUMERATORS OF SMOOTHING FILTER COEFFICIENTS
(DENOMINATOR IS 256)

BEFORE BLURRING
PROCESSING

AFTER BLURRING
PROCESSING

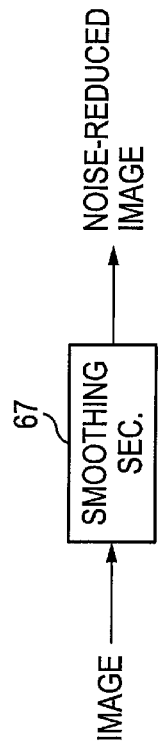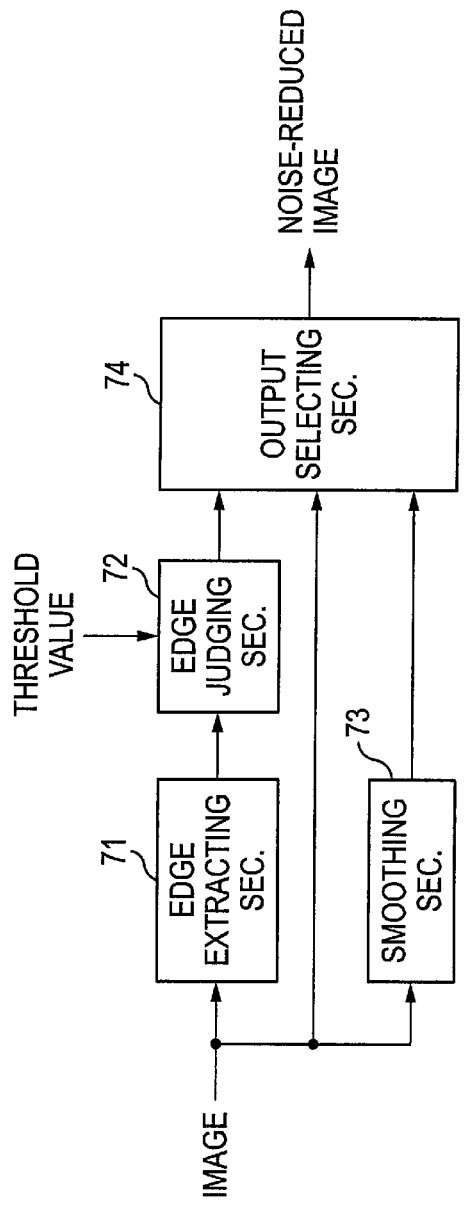
FIG. 18
FIG. 19

IMAGE PROCESSING METHOD, IMAGE PROCESSING APPARATUS, COMPUTER READABLE MEDIUM, AND IMAGING APPARATUS

CROSS-REFERENCE TO RELATED APPLICATIONS

This application is based upon and claims the benefit of priority from Japanese Patent Application No. 2009-187830, filed Aug. 13, 2009.

BACKGROUND

1. Technical Field

The present invention relates to an image processing method, an image processing apparatus, a computer readable medium, and an imaging apparatus which perform blurring on part of local areas of an image.

2. Related Art

If a person is shot with a camera (imaging apparatus) with its shooting mode set to a portrait mode, the aperture of the stop is set wide and the depth of field is made shallow. A resulting image becomes such that the outline of the image of the subject person is clear whereas the background image is blurred, that is, the image of the subject person stands out sharply against the background image. Likewise, if a flower, for example, is shot with a camera in close proximity with the shooting mode set to a macro mode, an image can be taken in which the background portion is blurred and hence is not conspicuous while the image of the flower (main subject) is clear.

As described above, in shooting a subject with a camera in certain kinds of scenes, it is important to blur a background image. However, whereas a background image can be blurred easily in the case of a camera having a large-diameter lens, it is difficult to take an image with a blurred background in the case of a camera having a small lens such as a compact digital camera.

In the above circumstances, as exemplified by the conventional techniques disclosed in the following Patent documents JP-A-2008-271240, JP-A-2008-271241, and JP-A-7-021365, image processing has come to be performed so that blurring is performed on a portion to be blurred and extracted from a subject image.

An image having a superior touch of blur is obtained by performing blurring on a local portion (in the above example, background portion) other than a main subject portion of a subject image taken with a camera.

However, image quality improvement by blurring is attained only in a case that blurring is performed on an image taken with low ISO sensitivity (e.g., ISO 80 or ISO 100). If blurring is performed on an image taken with high ISO sensitivity (e.g., ISO 400, ISO 800, or higher), a problem arises that a main subject portion appears too rough and noisy against a background portion that has been subjected to the blurring, as a result of which the image loses unity and feels incongruous as a whole.

SUMMARY OF THE INVENTION

According to an aspect of the invention, an image processing method includes a dividing process, a performing process, and a superimposing process. In the dividing process, an image is divided into plural local portions. In the performing process, the blurring processing is performed on at least one of the plural local portions. In the superimposing process, the artificial noise is superimposed on the at least one local portion.

BRIEF DESCRIPTION OF THE DRAWINGS

FIG. 18 is a block diagram showing a detailed configuration of each of first noise filtering sections shown in FIG. 17;

FIG. 19 is a block diagram showing a detailed configuration of each of second noise filtering sections shown in FIG. 17;

DETAILED DESCRIPTION

An exemplary embodiment of the present invention will be hereinafter described with reference to the drawings.

Figure 1:
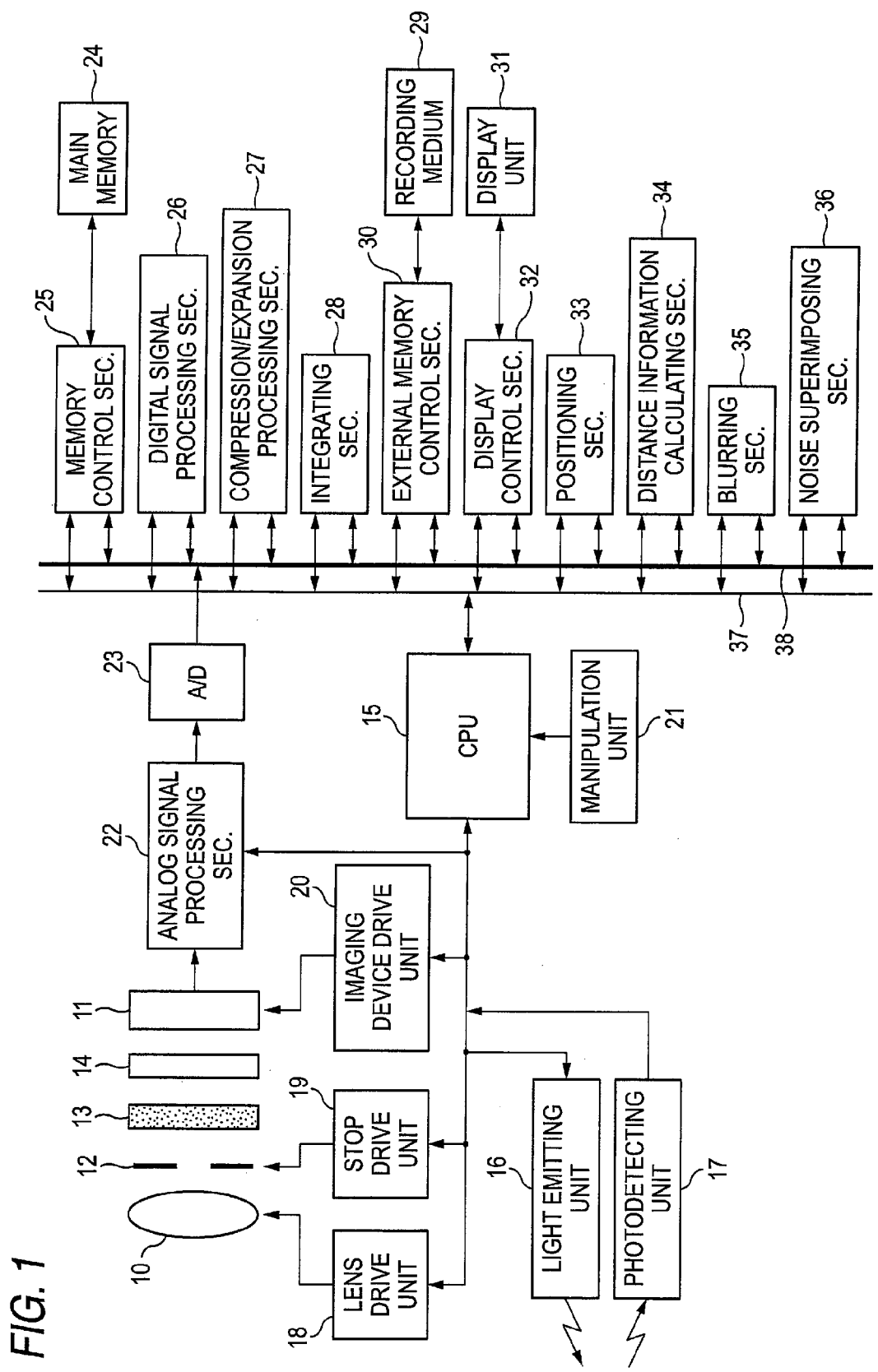
FIG. 1 is a block diagram showing the configuration of a digital still camera according to an exemplary embodiment of the present invention.

A digital still camera shown in FIG. 1 is equipped with a shooting lens 10 and a solid-state imaging device 11. A stop 12, an infrared cutting filter 13, and an optical lowpass filter 14 are disposed between the shooting lens 10 and the solid-state imaging device 11. A CPU 15, which controls the entire digital still camera, controls a light emitting unit 16 for flashing and a photodetecting unit 17, controls a lens drive unit 18 to adjust the position of the shooting lens 10 to a focusing position, and controls the aperture of the stop 12 via a stop drive unit 19 to adjust the exposure to a proper value.

Furthermore, the CPU 15 drives the solid-state imaging device 11 via an imaging device drive unit 20 so that the solid-state imaging device 11 outputs color signals of a subject image taken through the shooting lens 10. A user instruction signal is input to the CPU 15 via a manipulation unit 21, and the CPU 15 performs various controls according to the thus-received instruction signal. The solid-state imaging device 11 is a CCD sensor in which the pixels are arranged in honeycomb form or a CCD or a CMOS sensor in which the pixels are arranged in Bayer form.

The electrical control system of the digital still camera has an analog signal processing section 22 which is connected to the output of the solid-state imaging device 11 and an A/D converting circuit 23 for converting, into digital signals, RGB color signals that are output from the analog signal processing section 22. The section 22 and the circuit 23 are controlled by the CPU 15.

The electrical control system of the digital still camera also has a memory control section 25 which is connected to a main memory 24, a digital signal processing section 26 for performing image processing, a compression/expansion processing section 27 for compressing a shot image into a JPEG image and expanding a compressed image, an integrating section 28 for integrating each of the RGB digital image data that are output from the A/D converting circuit 23 and outputting integration values to the digital signal processing section 26, an external memory control section 30 to which a detachable recording medium 29 is to be connected, and a display control section 32 to which a display unit 31 which is mounted on, for example, the back side of the camera is connected.

The electrical control system also has a positioning section 33, a distance information calculating section 34, a blurring section 35, and a noise superimposing section 36 which operate as described later. The above sections constituting the electrical control system are connected to each other via a control bus 37 and a data bus 38 and controlled by instructions from the CPU 15.

Figure 2:
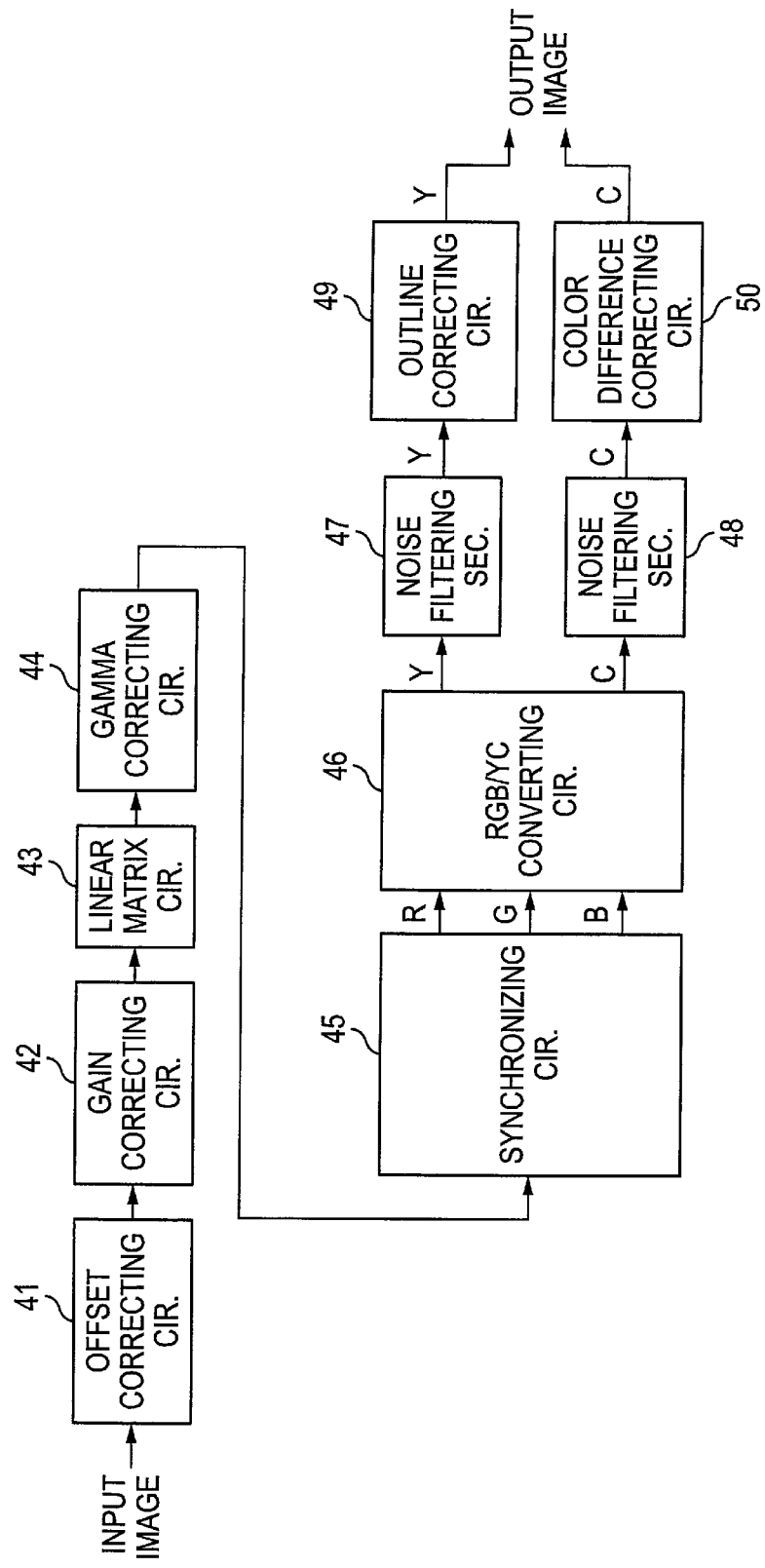
FIG. 2 is a block diagram showing a detailed configuration of a digital signal processing section shown in FIG. 1.

As shown in FIG. 2, the digital signal processing section 26 is equipped with an offset correcting circuit 41 which takes in the RGB image signals that are output from the A/D converting circuit 23 and performs offset processing thereon, a gain correcting circuit 42 which takes in output signals of the offset correcting circuit 41, receives the integration results of the integrating section 28 (see FIG. 1), and performs gain adjustment on each of the RGB signals to take white balance, a linear matrix circuit 43 for performing linear matrix processing on white-balance-adjusted image signals, and a gamma correcting circuit 44 for performing gamma correction on linear-matrix-processed image signals.

The digital signal processing section 26 is also equipped with a synchronizing circuit 45 for determining RGB signals at each pixel position by performing interpolation processing on gamma-corrected RGB color signals (image signals), an RGB/YC converting circuit 46 for calculating a luminance signal Y and color difference signals C (Cr and Cb) from the synchronized RGB signals, a noise filtering section 47 for performing noise reduction processing on the luminance signal Y that is output from the RGB/YC converting circuit 46, a noise filtering section 48 for performing noise reduction processing on the color difference signals C that are output from the RGB/YC converting circuit 46, an outline correcting circuit 49 for performing outline correction processing on a luminance signal Y that is output from the noise filtering section 47, and a color difference correcting circuit 50 for performing hue correction by multiplying color difference signals C that are output from the noise filtering section 48 by a color difference matrix.

Figure 3:
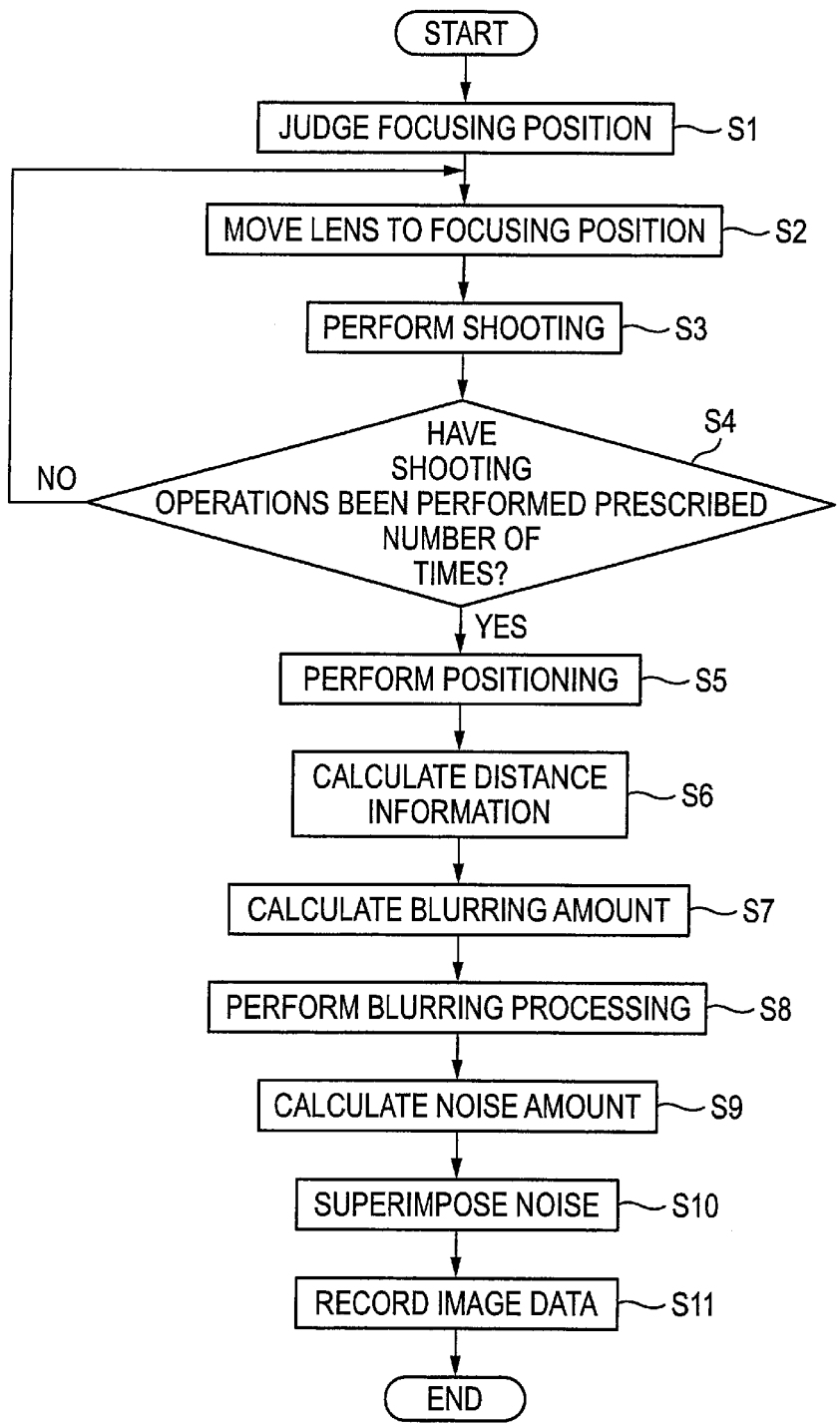
FIG. 3 is a flowchart of a process that is executed by the digital still camera of FIG. 1.

FIG. 3 is a flowchart of a control process of the digital still camera of FIG. 1. First, at step S1, a focusing position is judged. At this step, a focusing position of a main subject is judged in such a manner that the main subject is shot preliminarily with the solid-state imaging device 11 while the lens drive unit 18 drives the lens 10 and the integrating section 28 analyzes resulting image data (i.e., through image data that are output from the solid-state imaging device 11 and displayed on the display unit 31 before full depression of the shutter).

That is, what is called an AF (auto-focus) operation is performed at step S1. At the same time, focusing positions of plural subjects having different distances from the camera are calculated using the above data.

Figure 4:
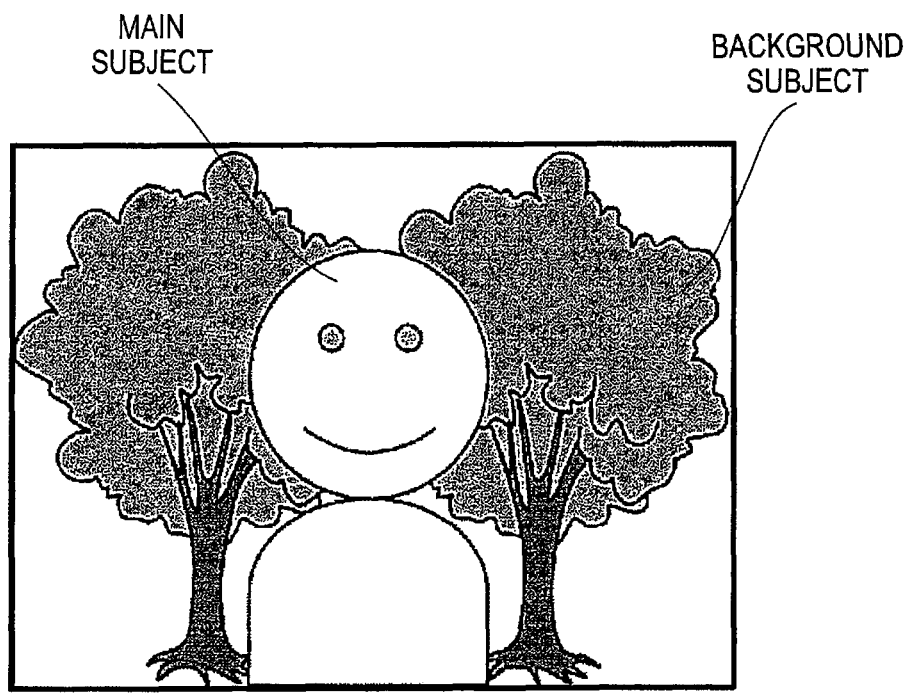
FIG. 4 illustrates subjects to be shot with the digital still camera of FIG. 1.

As shown in FIG. 4, it is assumed that in the following example focusing positions of one main subject (person) and other, background subjects (trees) are calculated and two consecutive shooting operations (what is called focus bracket shooting) are performed. It goes without saying that the number of focusing positions judged and the number of consecutive shooting operations may be three or more.

At step S2 shown in FIG. 3, the lens 10 is driven so as to be focused on the main subject. A shooting operation is performed at step S3. At step S4, it is judged whether or not shooting operations have been performed the prescribed number of times (in this example, two times). If shooting operations have not been performed the prescribed number of times yet, the process returns to step S2, where the lens 10 is focused on the background subjects. A shooting operation is performed at step S3.

If it is judged at step S4 that shooting operations have been performed the prescribed number of times (in this example, image A and image B have been taken with the lens 10 focused on the main subject and the background subjects, respectively), the process moves to step S5.

Figure 5A:
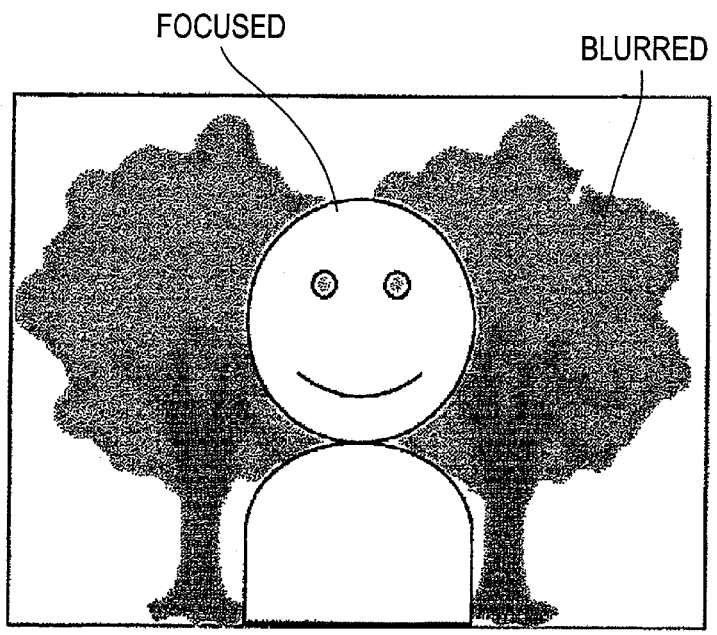
FIGS. 5A and 5B show two images A and B taken by two shooting operations of focus bracket shooting.
Figure 5B:
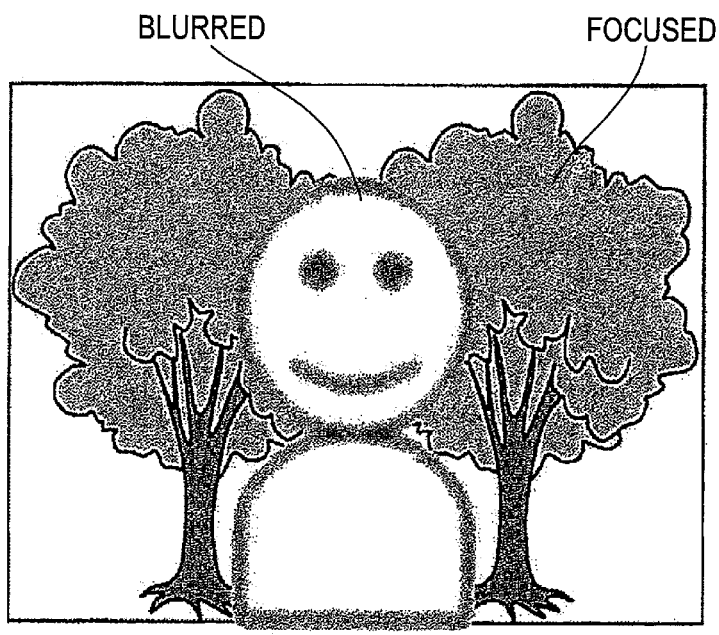

FIG. 5A shows, of the two images, image A taken with the lens 10 focused on the main subject in which the outline of the main subject (person) is clear whereas the background subjects (trees) are blurred. On the other hand, FIG. 5B shows image B taken with the lens 10 focused on the background subjects in which the outline of the main subject (person) is blurred whereas the outlines of the background subjects are clear.

After the two images have been taken, steps S5-S10 are executed which are steps of an image processing program which are important features of the exemplary embodiment. First, at step S5, the two images A and B which have been taken consecutively are positioned with respect to each other by the positioning section 33 shown in FIG. 1. The positioning processing makes it possible to compensate for a small change in angle of view that was caused between image A and image B due to a camera shake or a focusing position variation that occurred during the consecutive shooting operations.

Various positioning techniques are known. One method is such that block matching is performed between the two images A and B and one of these images is deformed by affine transformation or the like on the basis of resulting motion vectors.

At step S6, distance information calculation processing is performed by the distance information calculating section 34 shown in FIG. 1. At this step, pieces of distance information of the shot scene are calculated on the basis of the two images A and B. More specifically, the sharpness of image A and that of image B are compared with each other on a pixel-by-pixel basis and the focusing position of each pixel that is higher in sharpness is employed. Sharpness can be calculated using a well-known Laplacian filter, for example.

Figures 6, 7:
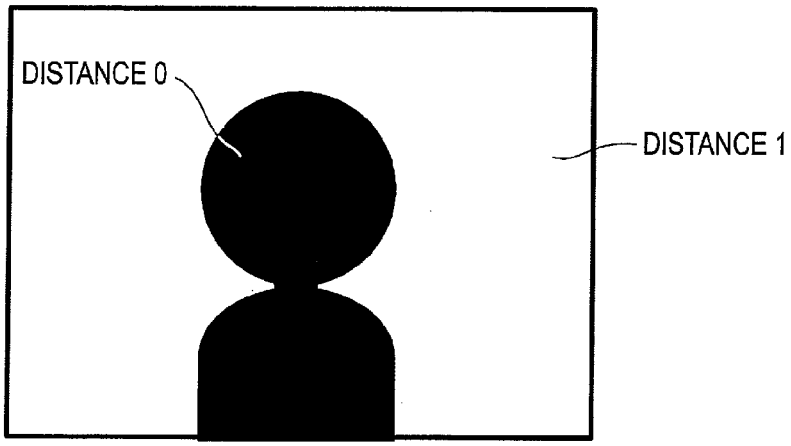
FIG. 6 shows local area reference data of the subjects shown in FIG. 4.
FIG. 7 shows example smoothing filters.

As a result, as shown in FIG. 6, a distance image indicating focusing positions of the respective pixels, that is, a local area discrimination image in which the image is divided into local areas, is obtained. In the example of FIG. 6, image A is higher in sharpness in an image area (person image area) having distance 0 and image B is higher in sharpness in an image area (background image area) having distance 1.

Since the respective focusing positions with which image A and image B were taken are known, physical distances of distance 0 and distance 1 can be determined. This distance image will be used as reference data in step S8 (blurring processing) and step S10 (noise superimposition processing) which will be described later. That is, this distance image serves as local area reference data that is referred to in discriminating each local area from the other local areas when pieces of image processing having different characteristics are performed on respective local areas (partial areas) of the image.

At step S7, the CPU 15 refers to the distance image and calculates a blurring amount using the individual reference values and the focal distances, the aperture, etc. that were employed in the shooting operations and calculates a blurring amount. The CPU 15 calculates a blurring amount in such a manner that the blurring amount is set larger when the difference (physical distance) between distance 0 and distance 1 is larger, the difference between the focal lengths employed in the shooting operations are larger, or the aperture is closer to the full open value. This makes it possible to provide a touch of blur as would be obtained when shooting is performed actually under shooting conditions including a shallow depth of field.

At step S8, the blurring section 35 shown in FIG. 1 performs blurring processing according to the blurring amount that was calculated at step S7. The blurring processing is performed on the lower-sharpness local area (in this example, background area) of image A which was taken with the lens 10 focused on the main subject.

The blurring processing (filtering) is performed by selecting a smoothing filter having a lower cutoff frequency when the blurring amount is larger. For example, blurring processing for the calculated blurring amount is performed by selecting one of five kinds of 11-tap digital filters shown in FIG. 7 according to the blurring amount and performing smoothing filtering in each of the horizontal direction and the vertical direction.

Figure 8:
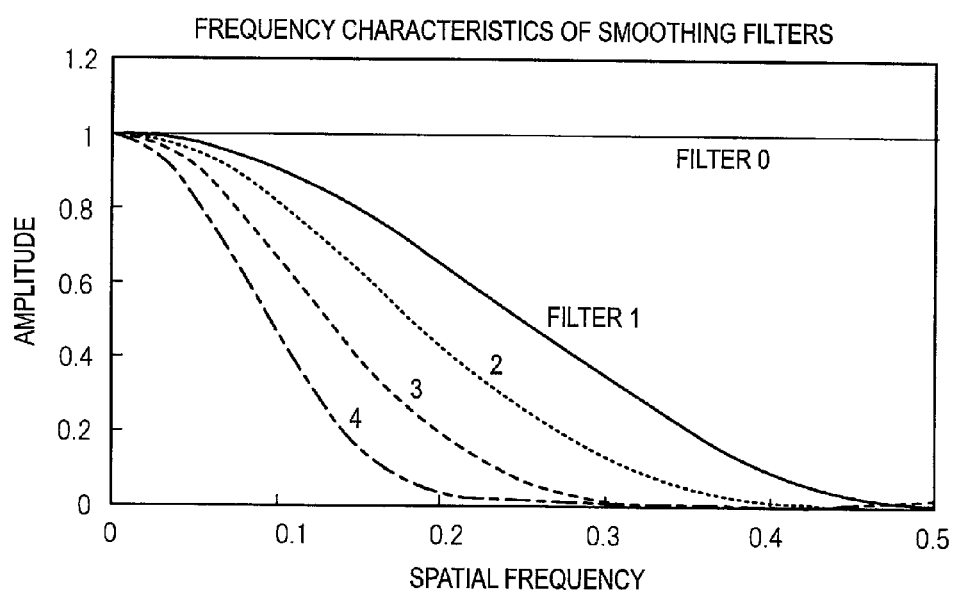
FIG. 8 is a graph showing frequency characteristics of the respective smoothing filters showing FIG. 7.
Figure 9:
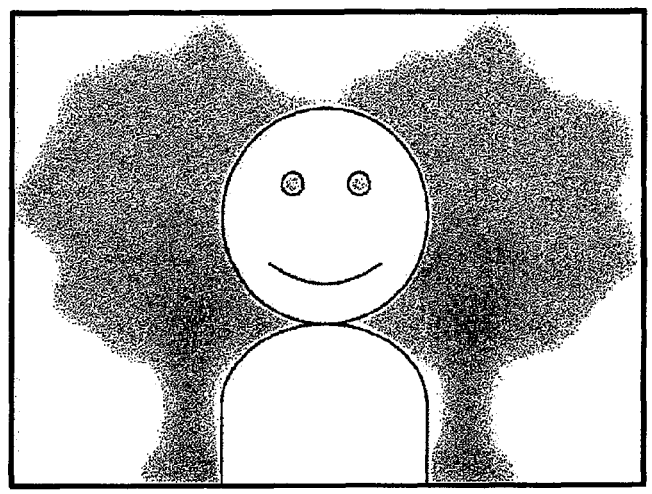
FIG. 9 shows an image obtained by performing blurring processing on image A of FIG. 5A.

FIG. 8 is a graph showing frequency characteristics of the five respective digital filters shown in FIG. 7. Since image A was taken with the lens 10 focused on the main subject, filter 0 having no blurring effect is applied to distance-0 portion or no blurring processing is performed on it. As a result, as shown in FIG. 9, an image that would be taken with a shallower depth of field is obtained by emphasizing the blur of the background portion.

However, the blurring processing has an aspect of noise reduction processing. Therefore, if image A to be subjected to blurring processing is an image that was taken with high sensitivity, that is, if image A is rough and noisy in its entirety, blurring only the background portion would produce an image in which the noisiness is reduced only in the background portion and which hence is unnatural as a whole, that is, feels incongruous.

Figure 10A:
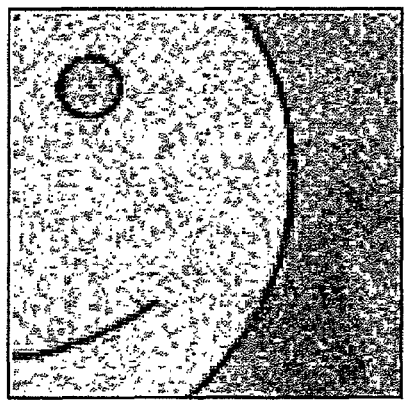
FIGS. 10A and 10B show enlarged versions of a part of image A of FIG. 5A and a part of the image of FIG. 9, respectively.
Figure 10B:
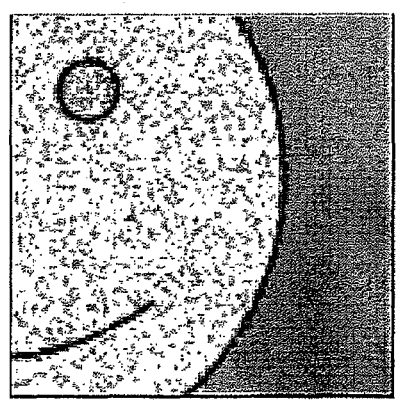

If the pre-blurring image is noisy in its entirety as shown in FIG. 10A, blurring only the background portion would reduce the noise amount of the background portion having a large blurring amount to make its noise amount different from the noise amount of the main subject portion that is not blurred, that is, produce an image in which the noise characteristic varies from one local area to another (see FIG. 10B). Such an image feels incongruous, that is, exhibits a touch that would result from artificial processing. It is therefore preferable not to perform blurring processing from the viewpoint of noisiness.

In view of the above, in the exemplary embodiment, at steps S9 and S10 shown in FIG. 3, processing of superimposing artificial noise on the blurred local area (in this example, background area; see FIG. 10B) so that this local area comes to be equivalent in noise amount to the non-blurred local area (in this example, main subject area). At step S11, resulting image data are recorded in the recording medium 29 (see FIG. 1).

Figure 11:
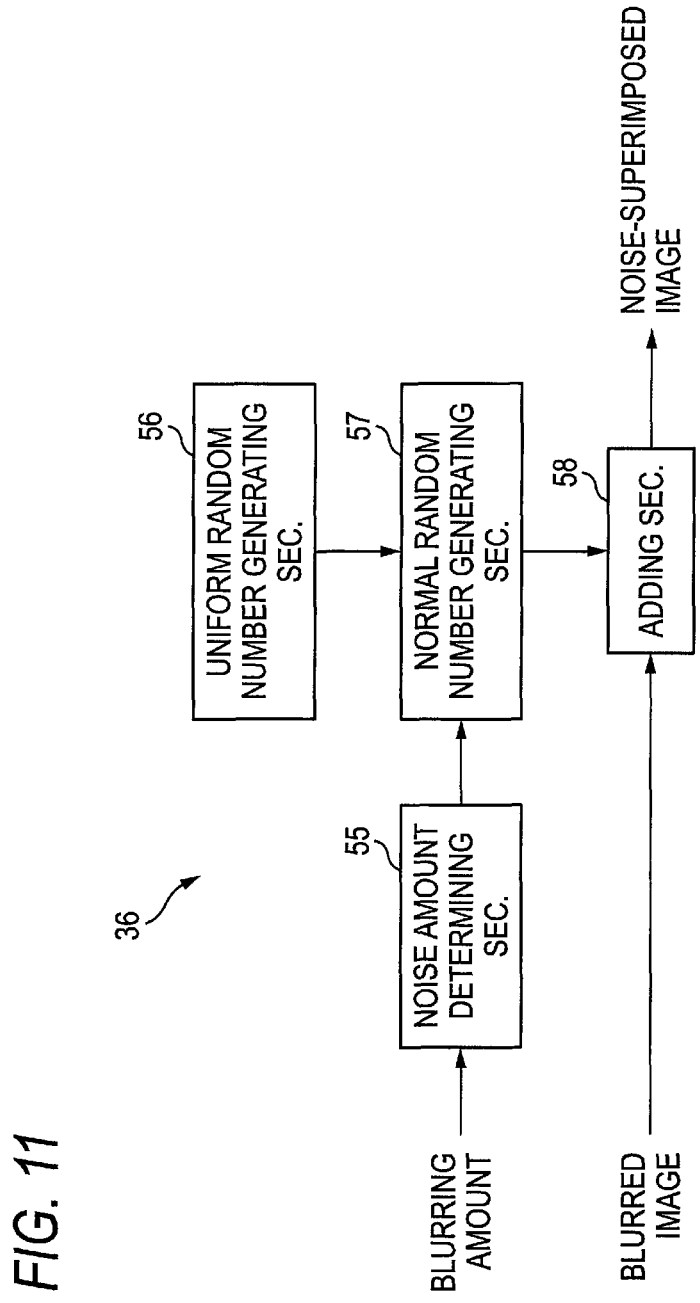
FIG. 11 is a block diagram showing a detailed configuration of a noise superimposing section shown in FIG. 1.

FIG. 11 is a block diagram showing a detailed configuration of the noise superimposing section 36 shown in FIG. 1. The noise superimposing section 36 is equipped with a noise amount determining section 55 which takes in the blurring amount that was calculated at step S7 and determines a noise amount, a uniform random number generating section 56, a normal random number generating section 57 which takes in an output of the uniform random number generating section 56 and an output of the noise amount determining section 55 and generates a normal random number, and an adding section 58 which takes in an output of the normal random number generating section 57 and a blurred image and superimposes artificial noise on each blurred local area.

The noise amount determining section 55 determines a noise amount in such a manner that the standard deviation σ of noise increases as the blurring amount of each pixel increases. The uniform random number generating section 56 generates two uniform random numbers ($\alpha$, $\beta$) which are integers in a range of 0 to a prescribed maximum value M. Uniform random numbers may be generated by any of known methods such as the mixed congruential method, middle square method, and Mersenne Twister method.

The normal random number generating section 57 generates a normal random number n having a standard deviation σ according to the following Formula 1 (Box-Muller method) using the generated uniform random numbers ($\alpha$, $\beta$). In Formula 1, "ln" means natural logarithm.

$$n = \sigma \cdot \sqrt{-2 \cdot \ln\left(\frac{\alpha}{M+1}\right)} \cdot \cos\left(2\pi \cdot \frac{\beta}{M+1}\right) \quad \text{[Formula 1]}$$

The adding section 58 adds, to the pixel value of each pixel of the blurred image, a normal random number generated for that individual pixel.

Figure 12:
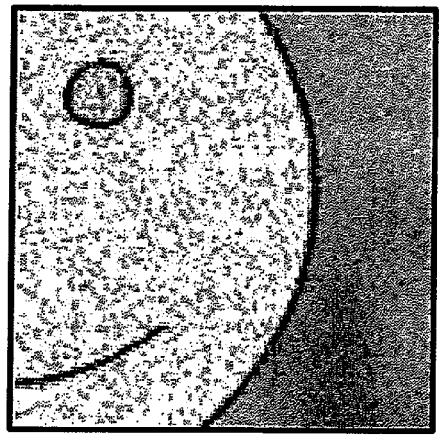
FIG. 12 shows an enlarged version of an important part of a noise-superimposed image.

With the above processing, noise having a larger standard deviation is superimposed on a pixel that has a larger blurring amount, that is, has been noise-reduced more by the blurring processing, whereby the noise reduction by the blurring processing can be compensated for by addition of artificial noise. As a result, as shown in FIG. 12, the roughness and the noisiness can be made uniform in the two areas located on both sides of the local area boundary and an image can be produced which does not feel incongruous.

As described above, in the exemplary embodiment, artificial noise is superimposed according to a blurring characteristic on an image that is generated by image processing of decreasing the apparent depth of field by blurring a subject image locally according to the distance to each subject. This makes it possible to reduce unnatural noisiness that would be caused by such image processing.

Figure 13:
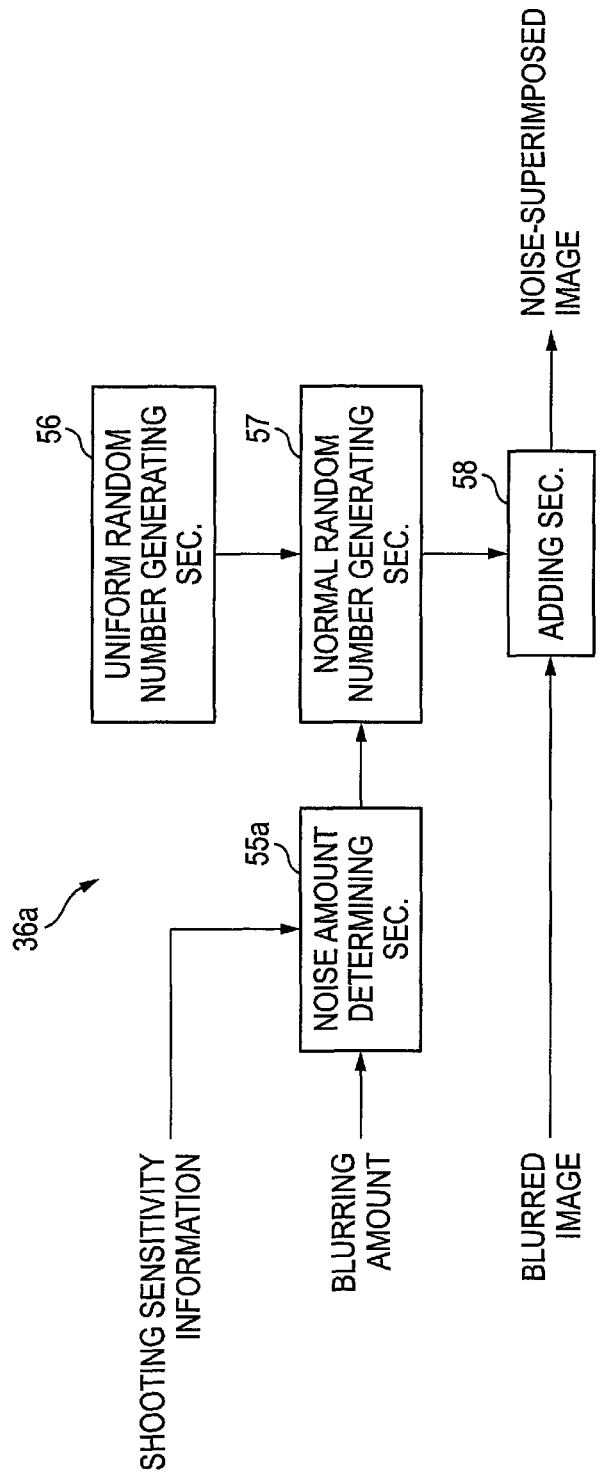
FIG. 13 is a block diagram showing a detailed configuration of a noise superimposing section according to an exemplary embodiment that is different from the exemplary embodiment of FIG. 11.

FIG. 13 is a block diagram showing a detailed configuration of a noise superimposing section 36a according to another exemplary embodiment of the invention. The noise superimposing section 36a is basically the same in configuration as the noise superimposing section 36 of FIG. 11, and is different from the latter in that a noise amount determining section 55a determines a noise amount also using shooting sensitivity information. The shooting sensitivity information is one of parameters that represent the noise characteristic of an image taken. Therefore, the noise superimposing section 36a according to another exemplary embodiment determines a noise amount taking into consideration not only a blurring amount but also an image noise characteristic.

The image noise characteristic is a noise characteristic of a pre-blurring image, and a main subject area which is not subjected to blurring processing continues to have noise represented by this characteristic even after the execution of the blurring processing.

In this exemplary embodiment, the shooting sensitivity information is referred to as a parameter representing the image noise characteristic. In general, the quantity of light shining on the solid-state imaging device 11 is smaller when the shooting sensitivity is higher. To obtain proper brightness with such a small light quantity, a high gain is employed in the analog signal processing section 22, for example, of the imaging apparatus, as a result of which noise is also amplified.

Figure 14:
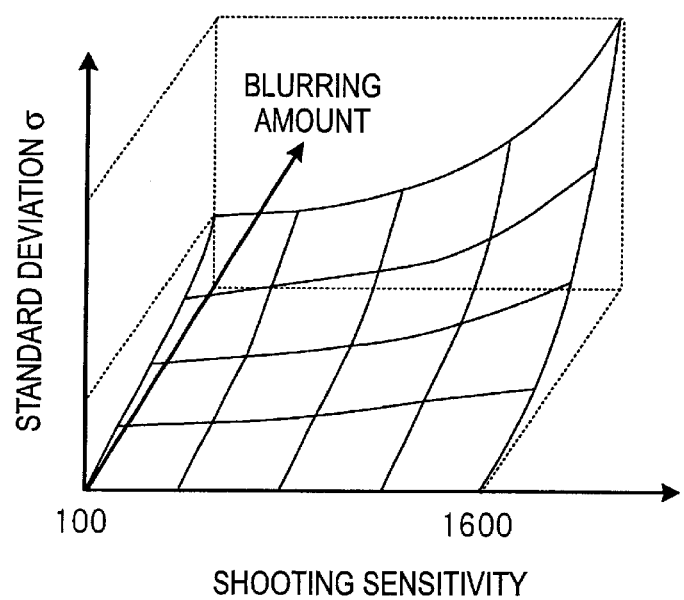
FIG. 14 is a graph showing how a noise amount is determined according to shooting sensitivity.

Therefore, as shown in FIG. 14, artificial noise for compensating for noise that has been reduced by blurring processing can be superimposed by determining a noise amount so that its standard deviation σ increases as the blurring amount or the shooting sensitivity increases. The relationship of FIG. 14 may be referred to by using a pre-adjusted table or performing a calculation according to a prescribed equation.

This exemplary embodiment makes it possible to more properly eliminate unnatural noisiness of an image that has been subjected to blurring processing, because the amount of noise to be superimposed is determined according to shooting sensitivity.

Figure 15:
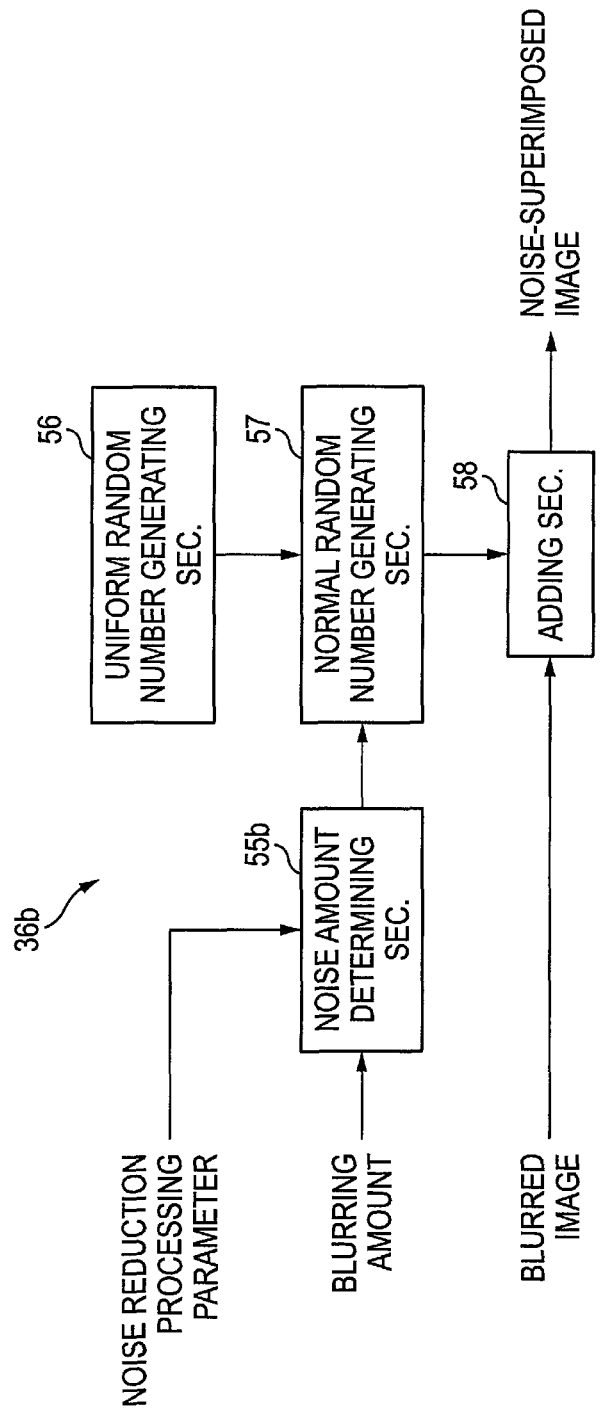
FIG. 15 is a block diagram showing a detailed configuration of a noise superimposing section according to an exemplary embodiment that is different from the exemplary embodiment of FIG. 13.

FIG. 15 is a block diagram showing a detailed configuration of a noise superimposing section 36b according to still another exemplary embodiment of the invention. The noise superimposing section 36b is basically the same in configuration as the noise superimposing section 36 of FIG. 11, and is different from the latter in that a noise amount determining section 55b determines a noise amount using not only a blurring amount but also a noise reduction processing parameter.

In ordinary imaging apparatus, when the shooting sensitivity is high, it is frequently carried out to suppress noise by noise reduction processing (image processing). Among various kinds of noise reduction processing are processing which uses a simple smoothing filter and processing in which signal edges are detected and edge portions are not smoothed while other, flat portions are smoothed.

Figure 16:
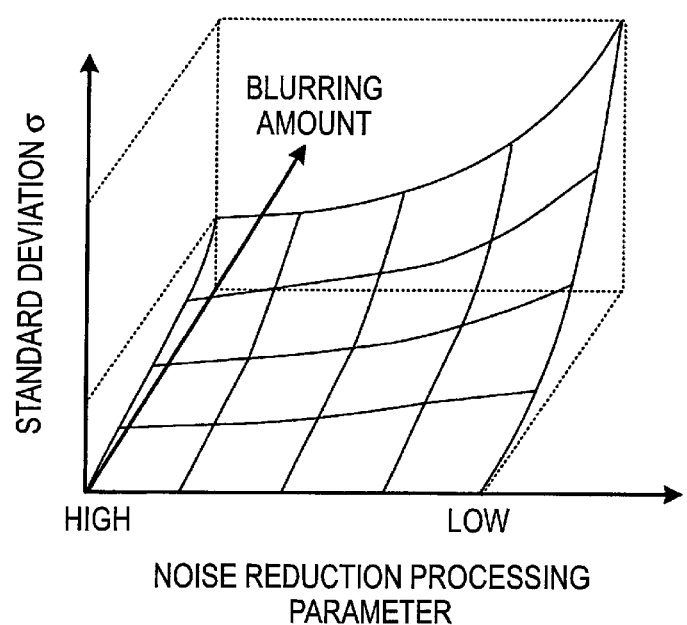
FIG. 16 is a graph showing how a noise amount is determined according to a noise reduction processing parameter value.

The use of the noise reduction processing parameter makes it possible to recognize what noise characteristic a pre-blurring image had. The standard deviation σ of noise to be superimposed is determined according to the noise reduction processing parameter and the blurring amount in the manner shown in FIG. 16.

For example, when the noise reduction processing parameter is low level, the noise amount in the pre-blurring image is large. Accordingly, under a certain blur amount, the amount of noise added to the blurring image when the noise reduction processing parameter is low level is larger than the amount of noise added to the blurring image when the noise reduction processing parameter is high level.

Determining the amount of noise to be superimposed according to a noise reduction processing parameter makes it possible to eliminate unnatural noisiness more properly.

In the exemplary embodiments of FIGS. 13 and 15, the amount of noise to be superimposed on a local area that has been subjected to blurring processing is calculated according to shooting sensitivity information or a noise reduction processing parameter. Alternatively, it is possible to calculate a noise amount by directly detecting, by image processing, a noise amount of a flat portion (non-edge portion) of a local area that is not subjected to blurring processing.

Figure 17:
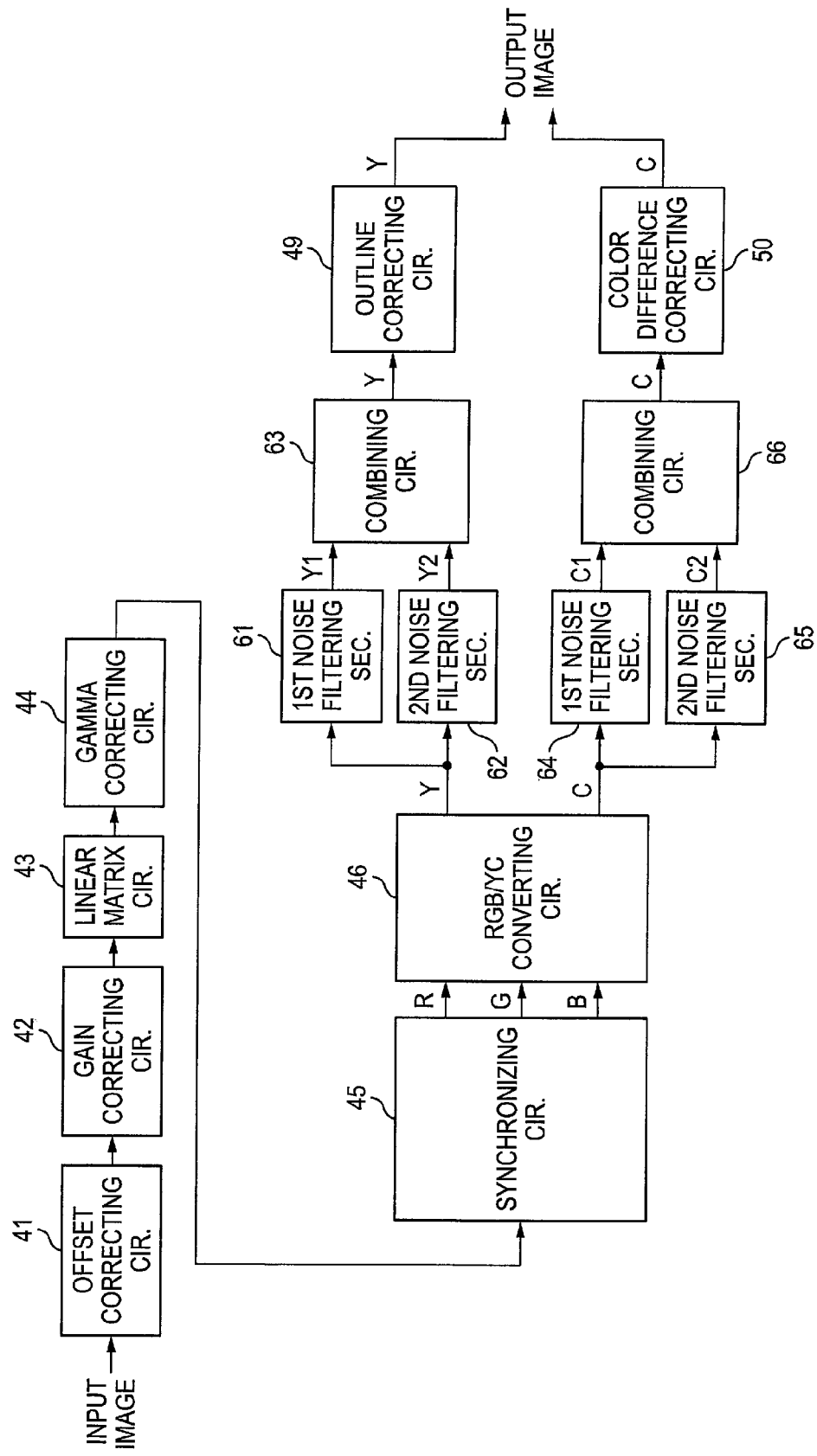
FIG. 17 is a block diagram showing a detailed configuration of a digital signal processing section according to an exemplary embodiment that is different from the exemplary embodiment of FIG. 2.

FIG. 17 is a block diagram showing the configuration of a digital signal processing section 26a according to yet another exemplary embodiment of the invention. The digital signal processing section 26a is basically the same in configuration as the digital signal processing section 26 described above with reference to FIG. 2. Therefore, sections and circuits having the same ones in FIG. 2 are given the same reference numerals as the latter and will not be described in detail. That is, only different sections and circuits will be described below in detail.

In the digital signal processing section 26a according to this exemplary embodiment, a first noise filtering section and a second noise filtering section 62 are provided in parallel as two noise reducing filters for reducing noise that is contained in a luminance signal Y. A combining circuit 63 selects an output signal of one of the noise filtering sections 61 and 62 and outputs it to the downstream outline correcting circuit 49.

Likewise, a first noise filtering section 64 and a second noise filtering section 65 are provided in parallel as two noise reducing filters for reducing noise that is contained in color difference signals C. A combining circuit 66 selects output signals of one of the noise filtering sections 64 and 65 and outputs them to the downstream color difference correcting circuit 50.

As described above, in this exemplary embodiment, two kinds of noise reduction processing having different characteristics are performed on a luminance signal Y of image A (see FIG. 5A). Likewise, two kinds of noise reduction processing having different characteristics are performed on color difference signals C. One (set) of signals obtained by performing the two kinds of noise reduction processing is selected for each pixel by combining processing.

FIG. 18 is a block diagram showing the configuration of each of the first noise filtering sections 61 and 64. To perform blurring processing while reducing noise in an image, each of the first noise filtering sections 61 and 64 is equipped with a smoothing section 67. For example, the smoothing section 67 is a simple smoothing filter as shown in FIG. 7.

FIG. 19 is a block diagram showing the configuration of each of the second noise filtering sections 62 and 65. Each of the second noise filtering sections 62 and 65 performs processing of reducing noise in an image while maintaining its sharpness. As shown in FIG. 19, each of the second noise filtering sections 62 and 65 is equipped with an edge extracting section 71 for taking in processing subject image data, an edge judging section 72 for judging, using a threshold value, whether or not output data extracted by the edge extracting section 71 represents an edge, a smoothing section 73 for taking in and smoothing the processing subject image data, and an output selecting section 74 which receives a judgment result of the edge judging section 72, each pixel value of the processing subject image, and an output of the smoothing section 73 and selects and outputs one of the pixel value of the processing subject image or a smoothed pixel value.

In each of the above-configured second noise filtering sections 62 and 65, the edge extracting section 71 detects an edge component of each pixel of a processing subject image using a Laplacian filter, for example, and the downstream edge judging section 72 judges whether or not the absolute value of an output of the Laplacian filter is larger than or equal to the threshold value. If it is larger than or equal to the threshold value, the edge judging section 72 judges that the edge component extracted by the edge extracting section 71 truly represents an edge portion. The processing subject image is smoothed by the smoothing section 73 which is a simple smoothing filter as shown in FIG. 7.

The output selecting section 74 outputs a pixel value of the input processing subject image for a pixel that is judged by the edge judging section 72 as constituting an edge, and outputs a pixel value as filtered by the smoothing section 73 for a pixel that is judged as constituting a flat portion rather than an edge. Operating in the above manner, each of the second noise filtering sections 62 and 65 can perform noise reduction processing capable of reducing noise of a flat portion of a processing subject image while maintaining its sharpness.

Figure 20:
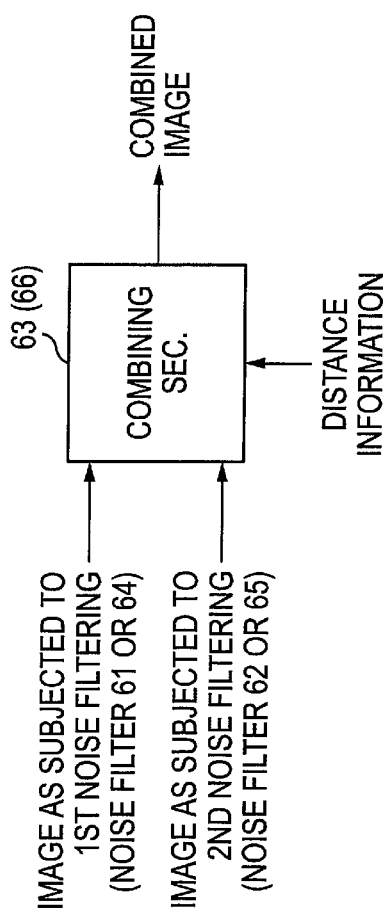
FIG. 20 shows, in detail, each of combining circuits shown in FIG. 17.

Each of the combining circuits 63 and 66 shown in FIG. 20 performs combining processing on a luminance signal Y or color difference signals C. That is, each of the combining circuits 63 and 66 takes in outputs of the first noise filtering section 61 or 64 and the second noise filtering section 62 or 65 and selects one of those noise-reduced outputs for each pixel according to distance information which was described above with reference to FIG. 6.

More specifically, each of the combining circuits 63 and 66 selects the output of the second noise filtering section 62 or 65 to maintain sharpness if the pixel belongs to a portion (main subject portion) having distance 0, and selects the output of the first noise filtering section 61 or 64 capable of blurring if the pixel belongs to a portion (background portion) having distance 1. The filtering characteristic of the smoothing section 67 of each of the noise filtering sections 61 and 64 is made equivalent to that of the smoothing section 73 of each of the noise filtering sections 62 and 65, whereby even portions having different pieces of distance information can be given the same noise reduction amount and hence an unnatural noisiness step occurring at the boundary between local areas having different pieces of distance information can be reduced.

This exemplary embodiment can shorten the processing time because the noise reduction processing and the blurring processing can be performed simultaneously. Furthermore, no noise superimposing processing is necessary because local areas having different pieces of distance information are given the same noise reduction amount.

Figure 21:
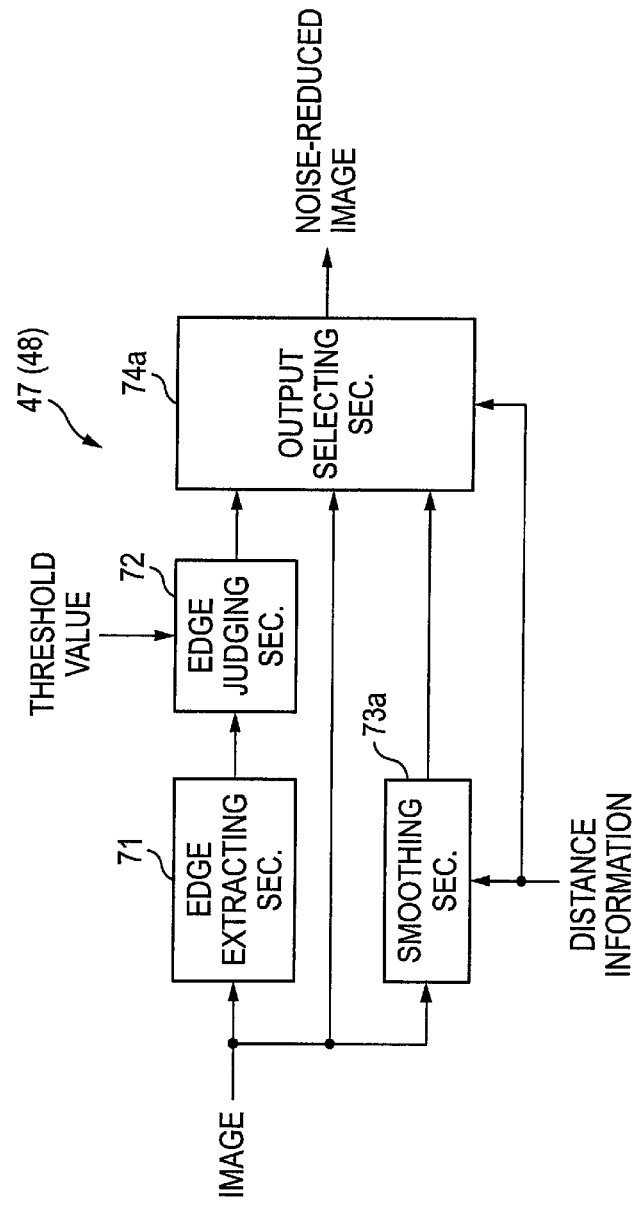
FIG. 21 is a block diagram showing a detailed configuration of each of noise filtering sections according to an exemplary embodiment that is different from the exemplary embodiment of FIG. 19.

FIG. 21 is a block diagram showing the configuration of each of noise filtering sections 47 and 48 according to a further exemplary embodiment of the invention. The digital signal processing section 26 according to this exemplary embodiment is the same as that according to the exemplary embodiment of FIG. 2, and the noise filtering section 47 or 48 shown in FIG. 21 is a detailed version of that shown in FIG. 2.

Each of the noise filtering sections 47 and 48 according to this exemplary embodiment is basically the same in configuration as each of the second noise filtering sections 62 and 65 shown in FIG. 19, and sections having the same sections in FIG. 19 are given the same reference numerals as the latter. Each of the noise filtering sections 47 and 48 according to this exemplary embodiment is different from each of the second noise filtering sections 62 and 65 according to the exemplary embodiment of FIG. 19 in that distance information is input to a smoothing section 73a and an output selecting section 74a.

In the smoothing section 73a of this exemplary embodiment, a processing subject image is processed by smoothing filters (e.g., ones shown in FIG. 7) having different cutoff frequencies according to distance information. For example, the local portion having distance 0 that is shown in FIG. 6 is filtered by filter 0 and the local portion having distance 1 is filtered by filter 4. In the output selecting section 74a, a pixel value itself of the processing subject image or a pixel value as smoothed by the smoothing section 73a is selected and output according to the distance information.

Figure 22:
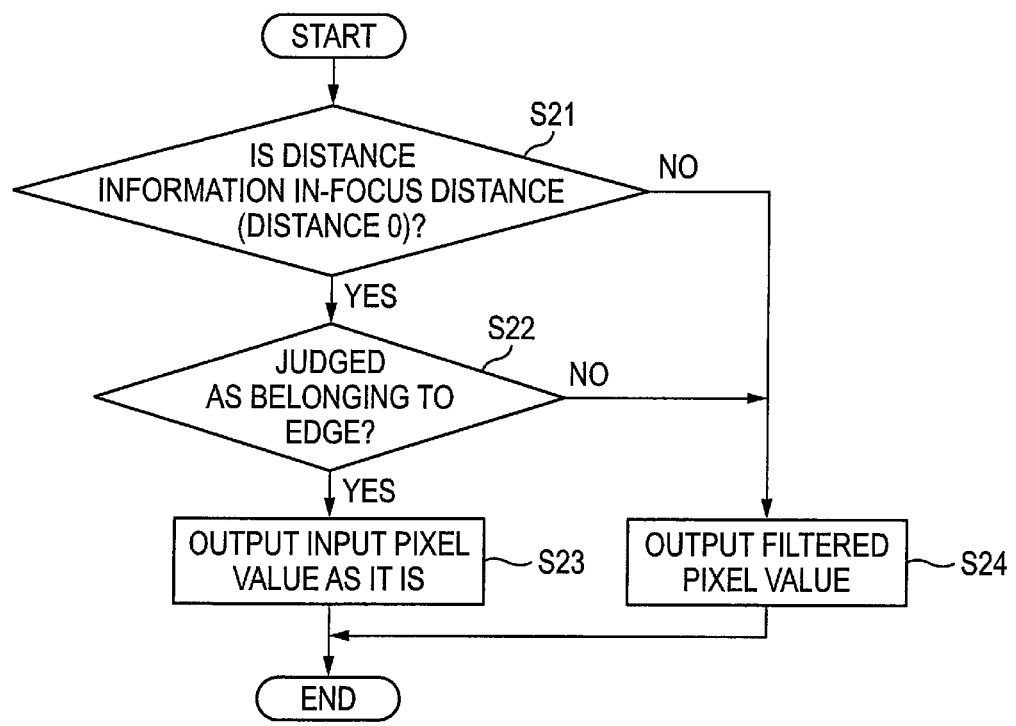
FIG. 22 is a flowchart of a process that is executed by an output selecting section shown in FIG. 21.

FIG. 22 is a flowchart of the output selecting process described above with reference to FIG. 21 which is executed by the output selecting section 74a. First, at step S21, it is judged whether or not distance information for the pixel as a subject of the output selecting process is an in-focus distance, that is, distance 0.

If the judgment result is affirmative, that is, if the distance information is an in-focus distance (distance 0), the process moves to step S22, where it is judged whether the edge judging section 72 judges that the pixel belongs to an edge. If the judgment result is affirmative, that is, if the distance information for the pixel is distance 0 and belongs to an edge, the process moves to step S23, where the pixel value itself of the processing subject pixel is selected and output. The output selecting process for the current pixel is finished, and the next pixel will be processed.

If the judgment result of step S21 is negative (i.e., the pixel belongs to a background area having distance 1) or the judgment result of step S22 is negative (i.e., the pixel belongs to a local area having distance 0 but does not belong to an edge), the process moves to step S24, where a pixel value as filtered by the smoothing section 73a is output. The output selecting process for the current pixel is finished, and the next pixel will be processed.

In this exemplary embodiment, a flat portion of an in-focus main subject portion of image A is noise-reduced while the sharpness of its edge portion is maintained. A background portion can be blurred while being noise-reduced by the same amount as the flat portion of the main subject portion. Unnatural noisiness can thus be reduced.

According to this exemplary embodiment, noise reduction processing and blurring processing can be performed simultaneously as in the exemplary embodiment of FIG. 17 and hence the processing time can be shortened. Since local areas having different pieces of distance information are noise-reduced by the same amount, no noise superimposition processing is necessary. Furthermore, unlike in the exemplary embodiment shown in FIG. 17, it is not necessary to use the two kinds of noise filtering sections 61 and 62 or 64 and 65, the combining circuits 63 and 66 are not necessary either, which means an advantage that the circuit configuration is simplified. Still further, unlike in the exemplary embodiment shown in FIG. 17, it is not necessary to perform plural kinds of processing on the same pixel, which means another advantage that the processing speed is increased.

Although the above exemplary embodiments are directed to the digital still camera, the invention can also be applied to other kinds of digital cameras such as a digital video camera and cameras that are incorporated in such electronic apparatus as a camera-incorporated cell phone, a PDA, and a notebook personal computer. Furthermore, although the above exemplary embodiments are directed to the single-lens camera, the invention can also be applied to a double lens camera such as a stereo camera.

Furthermore, although the above exemplary embodiments are directed to the image processing of the image processing function incorporated in the digital still camera, the invention can also be applied to image processing that is performed on subject image data that are taken out to an external personal computer or the like.

As described above, an image processing method, an image processing apparatus, and an image processing program according to one exemplary embodiment is characterized by dividing an image into plural local portions; performing blurring processing on at least one of the plural local portions; and superimposing artificial noise on the at least one local portion.

The image processing method, the image processing apparatus, and the image processing program according to this exemplary embodiment are further characterized in that the image is divided into the plural local portions according to pieces of distance information that represent distances to respective subjects contained in the image.

The image processing method, the image processing apparatus, and the image processing program according to this exemplary embodiment are further characterized in that an amount of the artificial noise is determined on the basis of a noise characteristic of the image.

The image processing method, the image processing apparatus, and the image processing program according to this exemplary embodiment are characterized in that the noise characteristic is determined on the basis of shooting sensitivity with which the image has been taken.

The image processing method, the image processing apparatus, and the image processing program according to this exemplary embodiment are characterized in that the noise characteristic is determined on the basis of a noise reduction processing parameter.

An image processing method, an image processing apparatus, and an image processing program according to another exemplary embodiment is characterized by dividing an image into plural local portions; performing blurring processing on at least one of the plural local portions except a subject edge thereof while maintaining sharpness of the edge portion; and performing blurring processing on local portions other than the at least one local portion without maintaining sharpness of a subject edge of each of the other local portions.

The image processing method, the image processing apparatus, and the image processing program according to this exemplary embodiment are characterized in that the image is divided into the plural local portions according to pieces of distance information that represent distances to respective subjects contained in the image.

An image processing method, an image processing apparatus, and an image processing program according to a further exemplary embodiment is characterized by performing first filtering and second filtering having different characteristics on each pixel of an image; dividing the image into plural local portions; and selecting a pixel value as subjected to the first filtering for each pixel of a subject edge of at least one of the plural local portions, and selecting a pixel value as subjected to the second filtering for each pixel, not subjected to the first filtering, of the plural local portions.

The image processing method, the image processing apparatus, and the image processing program according to this exemplary embodiment are characterized in that the first filtering is filtering of outputting an input pixel value as it is and the second filtering is blurring processing.

The image processing method, the image processing apparatus, and the image processing program according to this exemplary embodiment are characterized in that the image is divided into the plural local portions according to pieces of distance information that represent distances to respective subjects contained in the image.

In each of the above-described exemplary embodiments, the noise amount of a local area that has not been subjected to blurring processing is equivalent to that of a local area that has been subjected to blurring processing, whereby an image can be produced that does not feel incongruous as a whole.

INDUSTRIAL APPLICABILITY

The image processing method etc. according to the invention can produce an image that does not feel incongruous as a whole even if it has been subjected to image processing such as blurring processing, and hence is useful when applied to an image processing apparatus, an imaging apparatus, etc.

As described with reference to the above embodiment, approximately the same amount of noise is added to a local area that is subjected to blurring processing as to a local area that is not subjected to blurring processing or such two kinds of local regions are noise-reduced by the same amount. A resulting image is made uniform in roughness and does not feel incongruous as a whole.

What is claimed is:

1. An image processing method comprising:
dividing an image into plural local portions;
performing blurring processing on at least one of the plural local portions to blur a background of the image; and
superimposing artificial noise only on the at least one local portion so that a noise amount of the at least one local portion is consistent with a noise amount of portions other than the at least one local portion in the plural local portions where the blurring processing was performed.

2. The image processing method according to claim 1, wherein the image is divided into the plural local portions according to pieces of distance information that represents distances to respective subjects contained in the image.

3. The image processing method according to claim 1, wherein an amount of the artificial noise is determined based on a noise characteristic of the image.

4. The image processing method according to claim 3, wherein the noise characteristic is determined based on shooting sensitivity when the image is taken.

5. The image processing method according to claim 3, wherein the noise characteristic is determined based on a noise reduction processing parameter.

6. An image processing method comprising:
dividing an image into plural local portions;
performing blurring processing on at least one of the plural local portions except an edge of a subject in the at least one of the plural local portions while maintaining sharpness of the edge; and
performing blurring processing on local portions other than the at least one local portion without maintaining sharpness of an edge of a subject in the local portions other than the at least one local portion,
wherein performing blurring processing is to blur a background of the image.

7. The image processing method according to claim 6, wherein the image is divided into the plural local portions according to pieces of distance information that represent distances to respective subjects contained in the image.

8. An image processing apparatus comprising:
a local area discriminating unit configured to divide an image into plural local portions;
a blurring unit configured to perform blurring processing on at least one of the plural local portions to blur a background of the image; and
a noise superimposing unit configured to impose artificial noise only on the at least one local portion so that a noise amount of the at least one local portion is consistent with a noise amount of portions other than the at least one local portion in the plural local portions where blurring processing has been performed.

9. The image processing apparatus according to claim 8, wherein the image is divided into the plural local portions according to pieces of distance information that represent distances to respective subjects contained in the image.

10. The image processing apparatus according to claim 8, wherein an amount of the artificial noise is determined based on a noise characteristic of the image.

11. The image processing apparatus according to claim 10, wherein the noise characteristic is determined based on shooting sensitivity when the image is taken.

12. The image processing apparatus according to claim 10, wherein the noise characteristic is determined based on a noise reduction processing parameter.

13. An image processing apparatus comprising:
a local area discriminating unit configured to divide an image into plural local portions;
a first blurring unit configured to perform blurring processing on at least one of the plural local portions except an edge of a subject in the at least one of the plural local portions while maintaining sharpness of the edge; and
a second blurring unit configured to perform blurring processing on local portions other than the at least one local portion without maintaining sharpness of an edge of a subject in the local portions other than the at least one local portion,
wherein the first and second blurring units are configured to blur a background of the image.

14. The image processing apparatus according to claim 13, wherein the image is divided into the plural local portions according to pieces of distance information that represent distances to respective subjects contained in the image.

15. An imaging apparatus comprising:
an image processing apparatus having
a local area discriminating unit configured to divide an image into plural local portions;
a blurring unit configured to perform blurring processing on at least one of the plural local portions to blur a background of the image; and
a noise superimposing unit configured to impose artificial noise only on the at least one local portion so that a noise amount of the at least one local portion is consistent with a noise amount of portions other than the at least one local portion in the plural local portions; and
an imaging system that takes the image.

16. The image processing method of claim 1, wherein the artificial noise is superimposed on the at least one local portion on which the blurring process was performed so that the at least one local portion is equivalent in noise amount to the other of the plural local portions on which the blurring processing was not performed.

* * * * *